(12) United States Patent
Kashi

(10) Patent No.: US 11,170,339 B2
(45) Date of Patent: Nov. 9, 2021

(54) GENERATING EXCHANGE LOCATIONS

(71) Applicant: SMIOTA, INC., Pleasanton, CA (US)

(72) Inventor: Manjunatha Kashi, Milpitas, CA (US)

( * ) Notice: Subject to any disclaimer, the term of this patent is extended or adjusted under 35 U.S.C. 154(b) by 0 days.

(21) Appl. No.: 16/209,191

(22) Filed: Dec. 4, 2018

(65) Prior Publication Data

US 2019/0108481 A1 Apr. 11, 2019

Related U.S. Application Data

(63) Continuation-in-part of application No. 15/092,585, filed on Apr. 6, 2016, now Pat. No. 10,891,584.

(60) Provisional application No. 62/594,168, filed on Dec. 4, 2017.

(51) Int. Cl.
 *G06Q 10/08* (2012.01)

(52) U.S. Cl.
 CPC .................. *G06Q 10/0836* (2013.01)

(58) Field of Classification Search
 CPC .......... G06Q 10/0836; A47G 29/12–30; A47G 2029/12–14; G07F 11/00; G07F 17/00; G07D 11/00
 See application file for complete search history.

(56) References Cited

U.S. PATENT DOCUMENTS

| | | | | |
|---|---|---|---|---|
| 2007/0150375 | A1* | 6/2007 | Yang | G06Q 10/08 705/339 |
| 2015/0120602 | A1* | 4/2015 | Huffman | G06Q 10/083 705/339 |
| 2015/0186840 | A1* | 7/2015 | Torres | A47F 10/02 705/339 |
| 2015/0310381 | A1* | 10/2015 | Lyman | G06Q 10/083 705/330 |
| 2015/0371187 | A1* | 12/2015 | Irwin | G07F 5/18 705/72 |
| 2016/0033966 | A1* | 2/2016 | Farris | A47G 29/122 701/15 |
| 2016/0066732 | A1* | 3/2016 | Sarvestani | A47G 29/1201 232/24 |
| 2017/0010592 | A1* | 1/2017 | Wiechers | E05B 65/006 |
| 2017/0124510 | A1* | 5/2017 | Caterino | G07C 9/00896 |

OTHER PUBLICATIONS

Wenliang, Bian, and Nie Xuyun. "Unattended Home Delivery System Based On PKI Trust Model in Urban Areas." Proceedings of the Twelfth International Conference on Informatics and Semiotics in Organisations (ICISO) (2010). (Year: 2010).*

* cited by examiner

*Primary Examiner* — Scott M Tungate

(57) ABSTRACT

The subject disclosure relates to facilitating package drop off and pickup transactions by facilitating user devices to offer locations for storage, drop off and pickup of packages. In an aspect, a system is described comprising an intake component that receives a set of location data representing available locations for storing packages and a verification component that verifies the set of location data has been selected for use in storing packages.

20 Claims, 5 Drawing Sheets

200

202 — RECEIVING, BY A SYSTEM OPERATIVELY COUPLED TO A PROCESSOR, A SET OF LOCATION DATA REPRESENTING AVAILABLE LOCATIONS FOR STORING PACKAGES.

204 — VERIFYING, BY THE SYSTEM, THE SET OF LOCATION DATA HAS BEEN SELECTED FOR USE IN STORING PACKAGES.

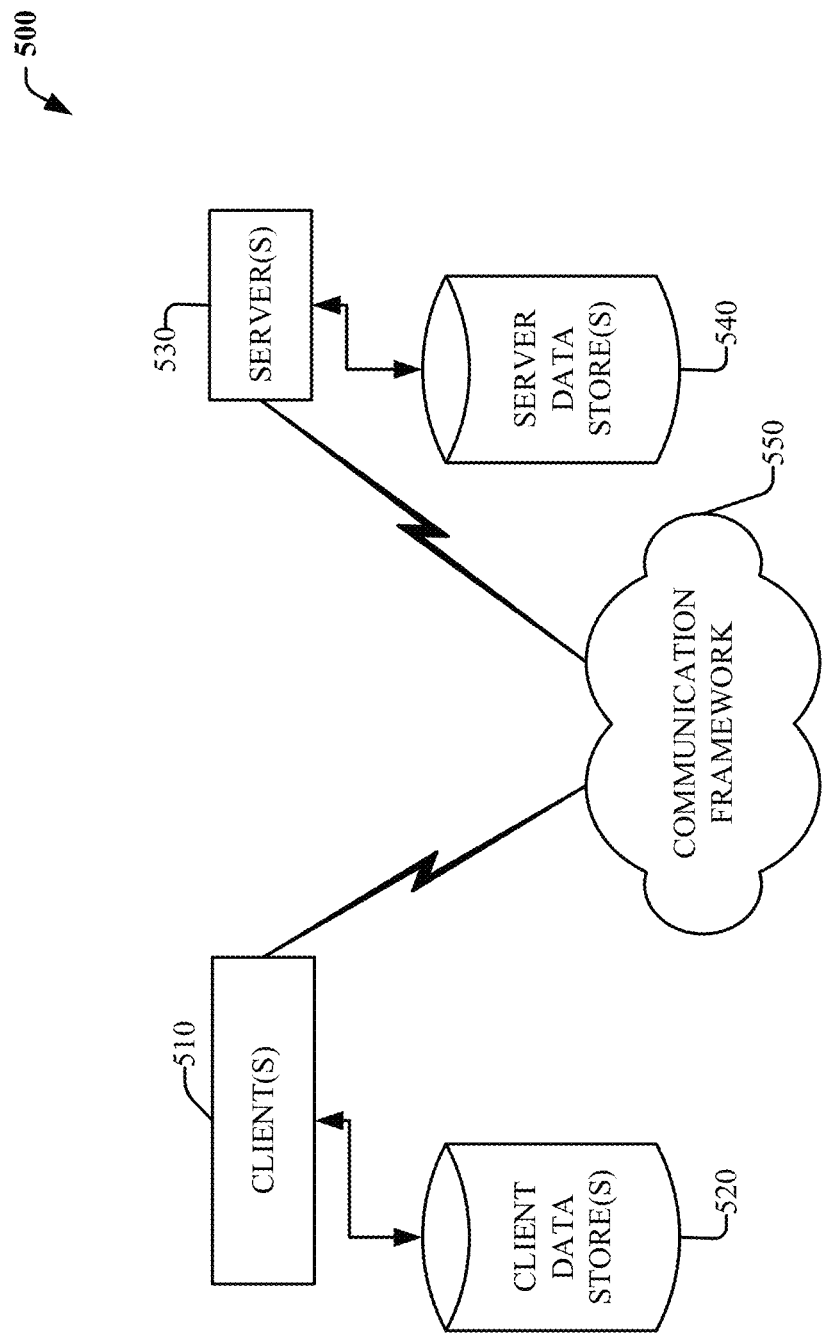

GENERATING EXCHANGE LOCATIONS

CROSS-REFERENCE TO RELATED APPLICATIONS

This application claims priority to U.S. Patent Application Ser. No. 62/594,168, filed on Dec. 4, 2017 and titled, "Generating Exchange Locations" and U.S. patent application Ser. No. 15/092,585, filed on Apr. 6, 2016 and titled, "Devices, Systems, and Methods for Storing Items". The entirety of the disclosure of the aforementioned application is considered part of, and is incorporated by reference in, the disclosure of this application.

BACKGROUND

Given the rise of e-commerce applications and the increased transactions of goods and services in the economy, there has been an increase in the quantity of deliveries that occur. For instance, most consumers shop online and order products for shipment directly to their homes on a frequent basis (e.g., daily, weekly, monthly, etc.). However, there are many problems with the current delivery logistic mechanisms. For instance, the last mile delivery problem describes the movement of a delivery package from a transportation hub to a final destination such as a residential home or business center. Often, the last leg of the delivery route poses serious cost-effective logistical problems for couriers. For instance, in some cases, delivery of a package in the last mile to the receiver can cost 33% of the total cost comprising delivery expenses. Furthermore, other delivery problems that contribute to delivery inefficiencies include delivery re-attempts, package theft, and the choice of many individuals to stay at home in order to safely retrieve delivered parcels, which decreases productivity of such individuals. All such problems require solutions or technologies to overcome such issues.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that employ system components to facilitate a transmission of data, instructions, and information between a first device and a second device to provide or deny access of the first device to storage items.

According to an embodiment, a system is provided. The system comprises a processor that executes computer executable components stored in memory. The computer executable components comprise a memory that stores computer executable components and a processor that executes the computer executable components stored in the memory, wherein the computer executable components comprise. In an aspect, the computer executable components comprise an intake component that receives a set of location data representing available locations for storing packages. In another aspect, the computer executable components comprise a verification component that verifies the set of location data has been selected for use in storing packages.

BRIEF DESCRIPTION OF THE DRAWINGS

FIG. 5 illustrates a block diagram of an example, non-limiting operating environment in which one or more embodiments described herein can be facilitated.

DETAILED DESCRIPTION

Figure 1:
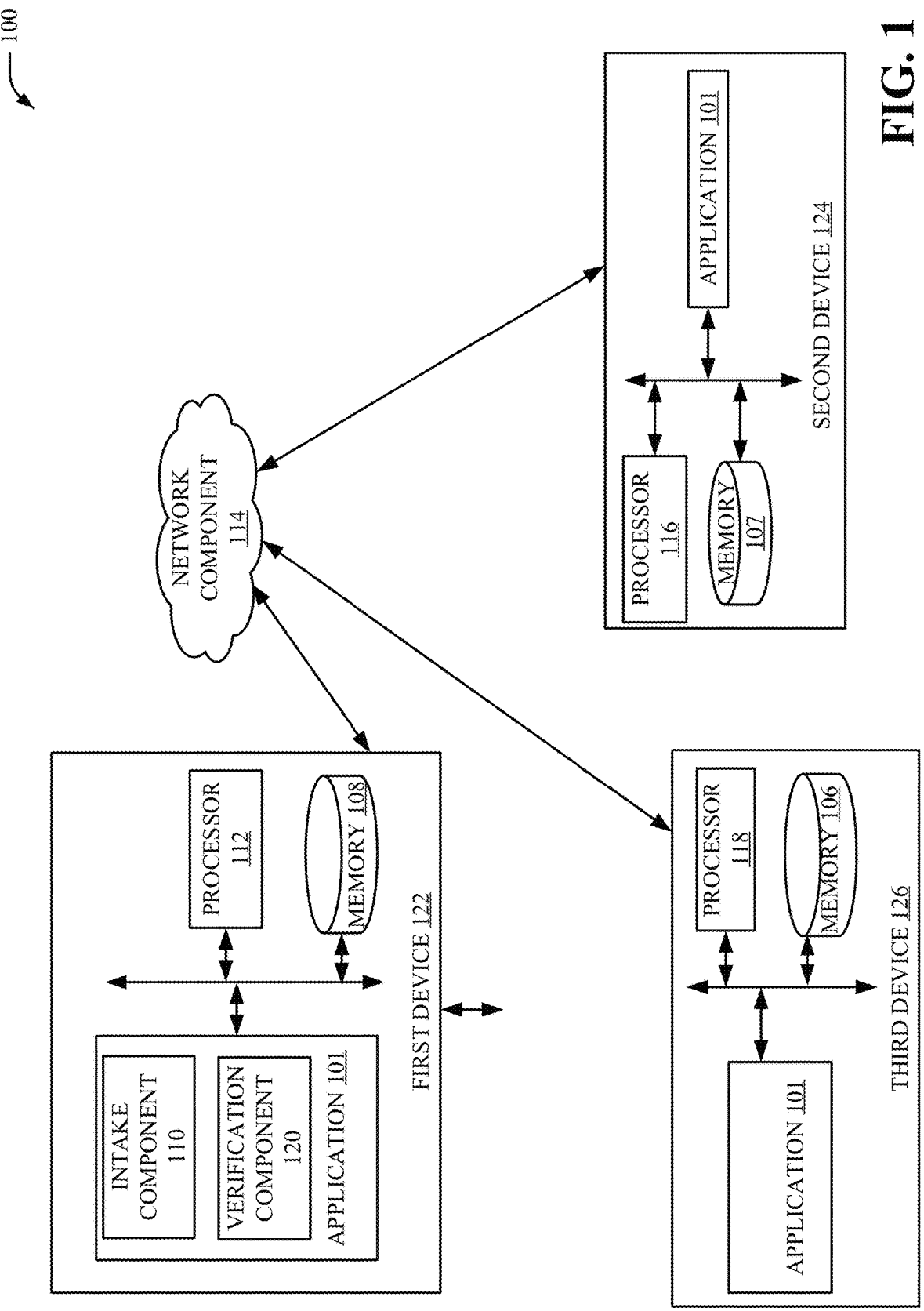
FIG. 1 illustrates a block diagram of an example, non-limiting system that can facilitate storing items at user generated storage locations in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In an aspect, disclosed herein are systems and methods for allowing user devices (e.g., owned by users) to submit a location for storage uses. For instance, several user devices (e.g., owned by users) can input information related to their real estate and offer to store packages at that real estate location. As such, a user with available garage space can offer to another user device (e.g., owned by a courier or delivery company) to include the available garage space as a destination hub for package delivery. Furthermore, a user can include a device, such as a digital locker device within the garage in order to allow for a secure storage mechanisms for numerous users to obtain their packages (e.g., from digital lockers). Also, the deliverer can securely and efficiently drop several packages to such destination location. In an aspect, the systems and methods disclosed herein enable any user to offer to store packages and have them delivered to an owned real estate area on behalf of others. As such, in a non-limiting instance, a users' garage can be offered and utilized as a shared space facilitating an exchange of packages or other items in order to reduce the number of miles both couriers (e.g., who would otherwise visit multiple single-family homes) and customers (e.g., who would otherwise have to visit the post office) would have to travel to exchange (e.g., deliver, pick-up, drop-off) items (e.g., packages, goods, products, etc.). As such, a users' garage (e.g., with installed smart lockers in some instances) can serve as a last mile or last-yard hub for an exchange of items.

In another aspect, the systems disclosed herein can facilitate couriers to select alternative drop off points for one or more packages that can fit efficiently within their delivery route and minimize cost pain points such as those posed by the last mile dilemma. In yet another aspect, package owners can depend on its package to be safely held at a pickup location convenient to them (e.g., on the owners street or near the owners workplace). For instance, an offered location for package storage can serve as a delivery site for a courier, a pickup location for a consumer to receive an incoming parcel, and/or a drop-off location for a consumer to leave a package for courier pickup (e.g., return or shipping a parcel with a pre-addressed label). In an aspect, the systems disclosed herein can recite cloud computing implementations, however, the subject disclosure is not limited to utilizing a cloud computing environment. In an aspect, cloud computing can refer to a service model for providing or enabling a convenient, on-demand access to a network that can include a shared pool of computing resources (e.g., networks, network bandwidth, servers, processing, memory, storage, applications, virtual machines, and services) capable of configuration and able to be rapidly deployed for use with other devices and requires limited management. This cloud model may include characteristics such as on-demand self-service, measured service, rapid elasticity, broad network access, and/or resource pooling.

Furthermore, cloud computing can be deployed using any of several service models such as the software as a service model, the infrastructure as a service model and/or the platform as a service model. In another aspect, the cloud computing model can be deployed using any of numerous deployment models such as a hybrid cloud model, a public cloud model, a private cloud model and/or a community cloud model. A notable feature of a cloud computing model is the relationship of numerous connected nodes that form a network. These networks allow for the interoperability of several devices. For instance, in an aspect, a local computing device can communicate with consumer devices (e.g., smart phones) using a cloud computing network of nodes. The cloud environment allows for personal devices to not require the maintenance of resources on a local device and instead utilize the cloud as an infrastructure or extension of the personal device. In an aspect, the cloud can include several layers such as a hardware layer, a software layer, a virtualization layer, a management layer, workload layer, an analytics processing layer, a software development layer and a command layer in our subject disclosure that allows for the communication with a locker device from a personal user device by utilizing a cloud infrastructure.

FIG. 1 illustrates a block diagram of an example, non-limiting system 100 that can facilitate an offering of a storage location in accordance with one or more embodiments described herein.

In an aspect, system 100 can comprise a memory 108 that stores computer executable components; a processor 112 that executes the computer executable components stored in the memory 108, wherein the computer executable components comprise an intake component 110 that receives a set of location data representing available locations for storing packages and a verification component 120 that verifies the set of location data has been selected for use in storing packages. In an aspect, system 100 can act as a platform that allows a first user device 122 representing an owner of real estate, a second user device 124 that represents a user needing to drop off or pickup a package, and a third user device 126 representing a package delivery organization that drops and picks up packages. In an aspect, first user device 122 can comprise an application 101 employing an intake component 110 and a verification component 120. In another aspect, each device can comprise a processor (e.g., processor 112, processor 116, processor 118) to execute system components. Furthermore, each device can comprise a memory (e.g., memory 108, memory 107, memory 106) to store the executable components. Also, in an aspect, application 101 can be executed and operate on any of first device 122, second device 124, and third device 126. In another aspect, all such devices can communicate with network component 114.

In an aspect, system 100 allows any owner of real estate to offer to utilize its room or open space for storing packages. As such, system 100 allows for the decentralization of storage warehouses and facilities by empowering every user device to allow its owner to use its space for storing packages. Furthermore, in an aspect, each owner can implement a smart mailbox device within the space to facilitate secure storage, delivery, and/or retrieval of items (e.g., packages, mail, articles, etc.). Accordingly, a homeowner can install a smart mailbox (hardware and software) unit in its garage comprising several storage compartments thus allowing for a delivery company to drop off and/or pickup several packages at the garage location and allowing several consumers to drop off and/or pickup packages at the garage location. Furthermore, the homeowner can indicate a range of available timings for the smart mailbox's to be accessible and can indicate other preferences related to transactions (e.g., requirements on package sizes, requirements on delivery/pickup times, blackout dates, etc.)

Also, in an aspect, the delivery organization can configure delivery logistics (e.g., routes, multiple package deliveries, etc.) in accordance with the new warehousing and storage options for package drop-off and pickup. Furthermore, the delivery organization can consolidate costs by reducing the last mile issue. In another aspect, the delivery organization can negotiate costs and other terms with the owner of the storage facility. Accordingly, system 100 can represent a platform that brings numerous user devices representing different parties together to facilitate package storage, delivery, and pickup tasks.

Turning now to FIG. 1, in a non-limiting embodiment, system 100 can comprise an intake component 110 that receives a set of location data representing available locations for storing packages. As such, a first user device representing an owner of storage space can log into the platform and offer to provide its space as a drop off and/or pickup location of packages. A second user device choosing to drop off or pick-up a package can view the first user device location and select whether or not to the location of the first user device is the drop off and pickup location. Furthermore, the third user device can also indicate whether the first user device location is acceptable as a storage location for its packages. If both the third user device and the second user device agree on the first user device location being an acceptable drop off and pickup location then the transaction can be verified (e.g., using verification component 120) as the selected location for storage of packages. In other non-limiting embodiments, the third user device can indicate preferred first user device locations and second user device can select from such list of locations. In other embodiments, second user device can select a courier whom accepts the first user device location for pickup and/or drop-off of the package.

As a non-limiting example, residents and/or business (represented by first user device) can utilize a garage or home as a hub for receiving, dropping off, or picking up deliveries of packages. As such, the first user device can sign up for a profile on the system 100 platform and present the storage location for available storage. In another non-limiting example, system 100 can be used by couriers (represented by third user devices) who are interested in consolidating deliveries and can utilize locations associated with first user devices (owners offering their owned space as storage facilities) as pickup and/or drop-off points. As such, third user devices can access system 100 and select pickup and/or drop-off points for packages. In another non-limiting example, residents or consumers or senders of packages (represented by second user devices) can utilize system 100 to send or receive packages at selected locations.

As an example, a first user device can indicate its location for drop off or pickup of packages via a smart mailbox in its garage. As such, first user device employs system 100 to indicate that its garage is populated with smart lockers comprising various technical capabilities (e.g., smart shelf, vision technology) to facilitate recordation of a proper chain of custody transaction between users of the storage lockers (e.g., identify all users whom access the storage locker for drop off and/or delivery). Furthermore, the first user device can indicate that the smart lockers are available in the garage 24 hours a day and seven days a week through the opening of the garage door or by equipping the garage door with an application technology, electronic keypad or other means to open the garage door and access the smart lockers. Also, in a non-limiting instance, the first user device can open the garage door on-demand after authenticating the parties for exchange transactions. Accordingly, system 100 can be utilized in diverse scenarios to connect various user devices and facilitate drop off and delivery transactions in a meaningful, cost-effective, and efficient manner.

Figure 2:
FIG. 2 illustrates a flow diagram of an example, non-limiting computer-implemented method that can facilitate storing items at user generated storage locations in accordance with one or more embodiments described herein.

FIG. 2 illustrates a flow chart of an example method 200 for facilitating storing items at user generated storage locations in accordance with one or more embodiments described herein. At 202, the system operatively connected to a processor can receive a set of location data representing available locations for storing packages. At 204, the system verifies the set of location data has been selected for use in storing packages.

Figure 3:
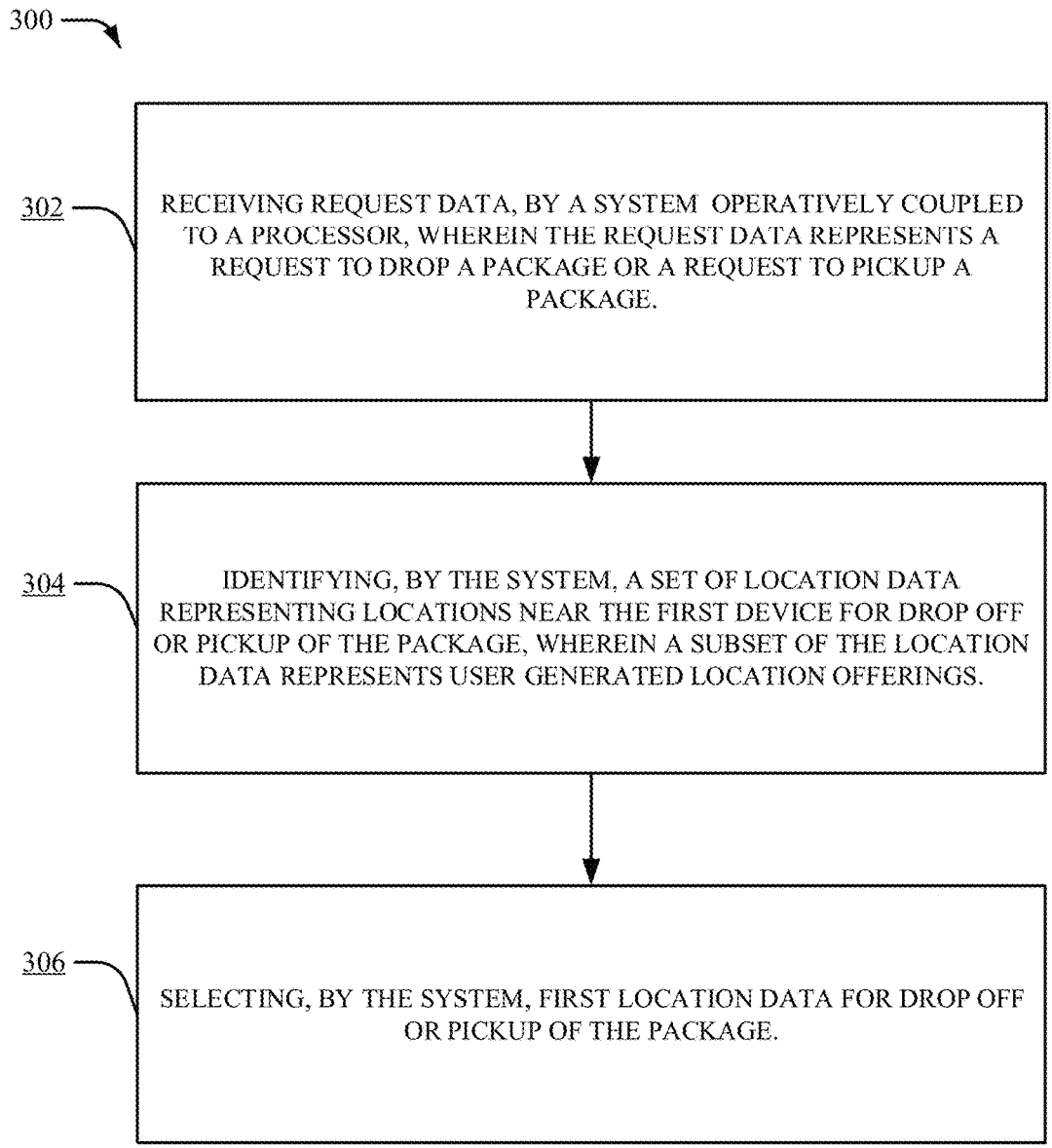
FIG. 3 illustrates a flow diagram of an example, non-limiting computer-implemented method that can facilitate storing items at user generated storage locations in accordance with one or more embodiments described herein.

FIG. 3 illustrates a flow chart of an example method 300 for facilitating storing items at user generated storage locations in accordance with one or more embodiments described herein. At 302, the system operatively connected to a processor can receive request data representing a request to drop a package or a request to pickup a package. At 304, the system can identify a set of location data representing locations near the first device 122 for drop off or pickup of the package, wherein a subset of the location data represents user generated location offerings. At 306, the system can select first location data for drop off or pickup of the package.

Figure 4:
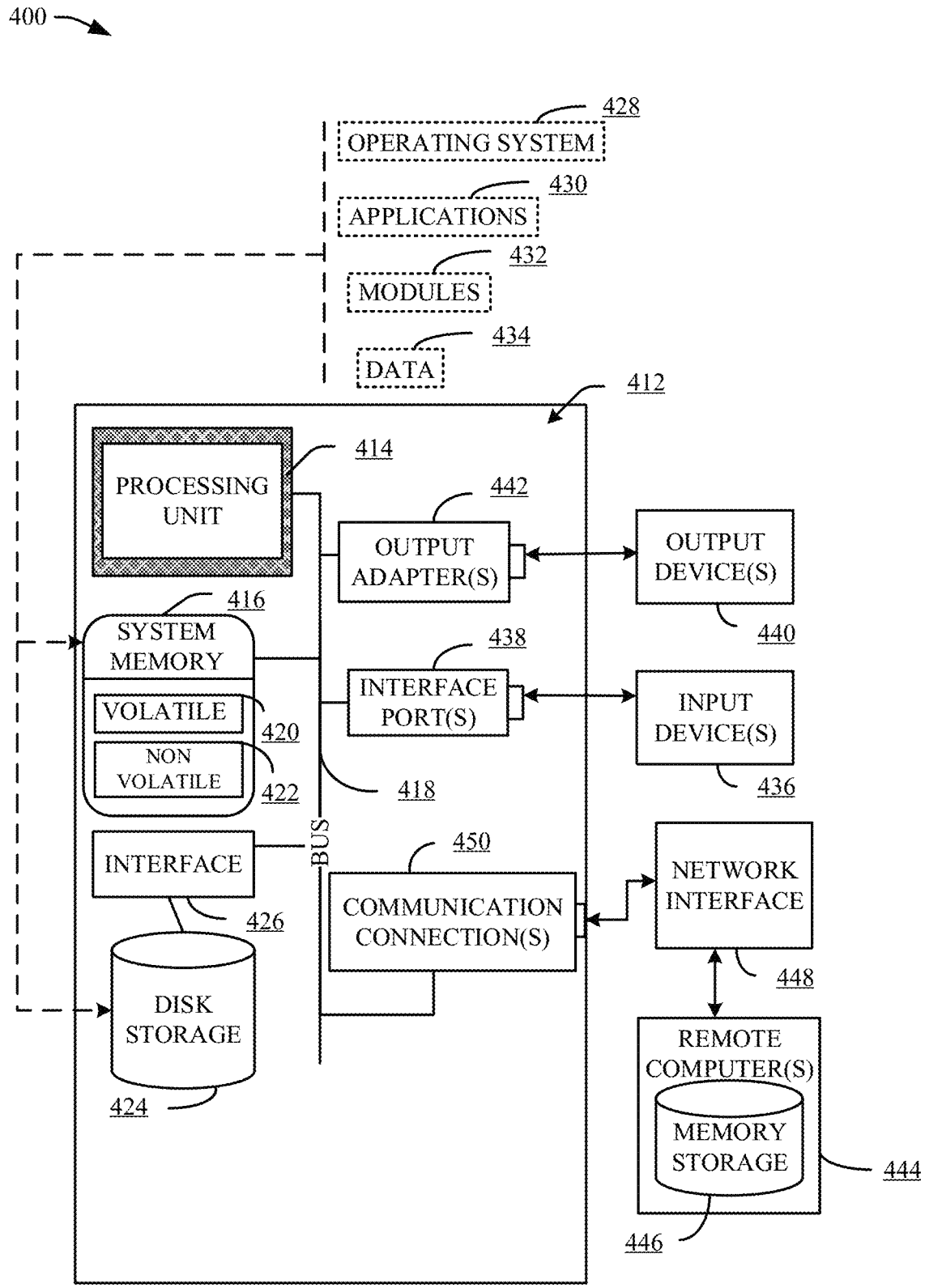
FIG. 4 illustrates a block diagram of an example, non-limiting operating environment in which one or more embodiments described herein can be facilitated.

In order to provide a context for the various aspects of the disclosed subject matter, FIG. 4 as well as the following discussion is intended to provide a general description of a suitable environment in which the various aspects of the disclosed subject matter can be implemented. FIG. 4 illustrates a block diagram of an example, non-limiting operating environment in which one or more embodiments described herein can be facilitated. With reference to FIG. 4, a suitable operating environment 400 for implementing various aspects of this disclosure can also include a computer 412. The computer 412 can also include a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 416 can also include volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 412 can also include removable/non-removable, volatile/non-volatile computer storage media. FIG. 4 illustrates, for example, a disk storage 424. Disk storage 424 can also include, but is not limited to, devices like a magnetic disk drive, floppy disk drive, tape drive, Jaz drive, Zip drive, LS-100 drive, flash memory card, or memory stick. The disk storage 424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 424 to the system bus 418, a removable or non-removable interface is typically used, such as interface 426. FIG. 4 also depicts software that acts as an intermediary between users and the basic computer resources described in the suitable operating environment 400. Such software can also include, for example, an operating system 428. Operating system 428, which can be stored on disk storage 424, acts to control and allocate resources of the computer 412.

System applications 430 take advantage of the management of resources by operating system 428 through program modules 432 and program data 434, e.g., stored either in system memory 416 or on disk storage 424. It is to be appreciated that this disclosure can be implemented with various operating systems or combinations of operating systems. A user enters commands or information into the computer 412 through input device(s) 436. Input devices 436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 414 through the system bus 418 via interface port(s) 438. Interface port(s) 438 include, for example, a serial port, a parallel port, a game port, and a universal serial bus (USB). Output device(s) 440 use some of the same type of ports as input device(s) 436. Thus, for example, a USB port can be used to provide input to computer 412, and to output information from computer 412 to an output device 440. Output adapter 1242 is provided to illustrate that there are some output device 440 like monitors, speakers, and printers, among other such output device 440, which require special adapters. The output adapters 442 include, by way of illustration and not limitation, video and sound cards that provide a means of connection between the output device 440 and the system bus 418. It should be noted that other devices and/or systems of devices provide both input and output capabilities such as remote computer(s) 444.

Computer 412 can operate in a networked environment using logical connections to one or more remote computers, such as remote computer(s) 444. The remote computer(s) 444 can be a computer, a server, a router, a network PC, a workstation, a microprocessor based appliance, a peer device or other common network node and the like, and typically can also include many or all of the elements described relative to computer 412. For purposes of brevity, only a memory storage device 446 is illustrated with remote computer(s) 444. Remote computer(s) 444 is logically connected to computer 412 through a network interface 448 and then physically connected via communication connection 450. Network interface 448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 450 refers to the hardware/software employed to connect the network interface 448 to the system bus 418. While communication connection 450 is shown for illustrative clarity inside computer 412, it can also be external to computer 412. The hardware/software for connection to the network interface 448 can also include, for exemplary purposes only, internal and external technologies such as, modems including regular telephone grade modems, cable modems and DSL modems, ISDN adapters, and Ethernet cards.

Referring now to FIG. 5, there is illustrated a schematic block diagram of a computing environment 500 in accordance with this disclosure. The system 500 includes one or more client(s) 502 (e.g., laptops, smart phones, PDAs, media players, computers, portable electronic devices, tablets, and the like). The client(s) 502 can be hardware and/or software (e.g., threads, processes, computing devices). The system 500 also includes one or more server(s) 504. The server(s) 504 can also be hardware or hardware in combination with software (e.g., threads, processes, computing devices). The servers 504 can house threads to perform transformations by employing aspects of this disclosure, for example. One possible communication between a client 502 and a server 504 can be in the form of a data packet transmitted between two or more computer processes wherein the data packet may include video data. The data packet can include a metadata, e.g., associated contextual information, for example. The system 500 includes a communication framework 506 (e.g., a global communication network such as the Internet, or mobile network(s)) that can be employed to facilitate communications between the client(s) 502 and the server(s) 504.

Communications can be facilitated via a wired (including optical fiber) and/or wireless technology. The client(s) 502 include or are operatively connected to one or more client data store(s) 508 that can be employed to store information local to the client(s) 502 (e.g., associated contextual information). Similarly, the server(s) 504 are operatively include or are operatively connected to one or more server data store(s) 510 that can be employed to store information local to the servers 504. In one embodiment, a client 502 can transfer an encoded file, in accordance with the disclosed subject matter, to server 504. Server 504 can store the file, decode the file, or transmit the file to another client 502. It is to be appreciated, that a client 502 can also transfer uncompressed file to a server 504 and server 504 can compress the file in accordance with the disclosed subject matter. Likewise, server 504 can encode video information and transmit the information via communication framework 506 to one or more clients 502.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAIVI). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAIVI), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
one or more processors;
one or more storage devices comprising processor executable instructions that, responsive to execution by the one or more processors, cause the system to perform operations comprising:
providing, over a communication network, by a server device, user interfaces to user devices, wherein the user interfaces comprise fields associated with user generated residential locations representing locations of smart locker devices and availability of the smart locker devices to execute smart locker operations, wherein the smart locker devices are configured to execute smart locker operations comprising at least one of storing, receiving or providing access to one or more packages within a set of compartments of the smart locker devices, wherein the set of compartments are connected to a set of compartment doors, and wherein the smart locker devices are housed within secure facilities of the user generated residential locations;
indicating, over the communication network, by the user devices corresponding toowners of the smart locker devices, that the smart locker devices located at the user generated residential locations are available or unavailable as a destination hub for other user devices corresponding to users or authorized users acting on behalf of the users other than an owner of the smart locker devices, to execute the smart locker operations, store packages within a compartment of the set of compartments, store packages within the compartment for pickup, or retrieve packages from the compartment;
generating, over the communication network, by the server device a user generated network of residential package service facilities based on indications that the user generated residential locations are available or unavailable as the destination hub for other user devices corresponding to the users or the authorized users acting on behalf of the users other than the owners of the smart locker devices to perform the smart locker operations, store packages within the compartment, store packages within the compartment for pickup or retrieve packages from the compartment;

receiving, over the communications network and from the server device, by a courier computing device the user generated residential locations;

triggering a selection, over the communications network, by the courier computing device, of a first user generated residential location of the user generated residential locations as a target destination based at least partially on a proximity of the first user generated residential location to a location of the courier computing device, an availability of a subset of compartments of the set of compartments, a presence of target technical capabilities of a smart locker device located at the first user generated residential location, operability of the smart locker device within a target time range, and verification, by the server device, of an acceptance of the selection by a user device authorized to control the smart locker device;

verifying, over the communications network, by the server device, the acceptance of the selection of the target destination by the user device and an identity of the user device and the smart locker device;

receiving, over the communications network from the server device, by the courier computing device, an electronic keypad access code to permit access to a secure facility of the smart locker device;

receiving, over the communications network from the courier computing device, by the server device an unlocking request to unlock a first compartment door of a first compartment of the smart locker device;

automatically unlocking, by the smart locker device, the first compartment door of the first compartment based on the unlocking request and a verification of the courier computing device unlocking permission status based on a set of permission criteria and satisfaction of a set of enhanced security and access requirements comprising:
  receiving, by the smart locker device, authorization data of a user requesting access to the first compartment in accordance with a first security mechanism, wherein the authorization data represents an access code comprising at least one of a driver license number or social security number of an authorized user;
  determining, by a processor of the server device, whether the intake authorization data is valid based on a comparison of the intake authorization data to valid authorization data and valid age data;
  grant access to a second security mechanism for one or more predefined period of time based on determining the intake authorization data is valid authorization data;
  triggering a capture of image data, by a camera portion of the smart locker device corresponding to the user requesting access to the first compartment;
  determining, by the processor of the server device, whether the user image data corresponds to a valid authorized user based on a comparison of the user image data to a valid authorized user image stored at a database of the server device;
  granting, by the processor of the server device, access to a third security mechanism based on determining the user image data is valid user image data;
  triggering, by the smart locker device, a capture of access input data from a group consisting of biometric validation data and optical recognition validation data;
  determining, by the processor of the server device, whether the biometric validation data or the optical recognition validation data corresponds to a valid authorized user based on a comparison of the user image data to a valid authorized biometric validation data and valid authorized optical recognition data stored at a database of the server device;
  notifying, by the processor of the server device, the smart locker device of an authorization of the authorization data, the user image data, and the optical recognition validation data;
  based on the authorization of the user image data, the smart locker device automatically unlocks a locking mechanism of a first door of the first compartment for the one or more predefined period of time to unlock the first;
receiving, over the communication network from the smart locker device, by the server device, door sensor data representing an occurrence of the first compartment door closing based on a sensor device coupled to the first compartment door, first weight data representing a decrease of weight applied to a shelf of the first compartment coupled to a weight sensor as compared to a previous weight within a determined time interval prior to the first compartment door closing, or second weight data representing an increase of weight applied to the shelf of the first compartment coupled to the weight sensor as compared to a previous weight within a determined time interval prior to the first compartment door closing, wherein the decrease of weight represents a removal of a package from the first compartment, and wherein the increase in weight represents an insertion of the package into the first compartment; and
triggering, by the smart locker device, a locking of the first compartment door based on the door sensor data, first weight data, or the second weight data.

2. The system of claim 1, wherein the target technical capabilities comprise, at least one of a machine vision recordation capability.

3. The system of claim 1, further comprising, triggering receipt, by the server device, of a chain of custody event between the user device, the server device, and the smart locker device based on occurrence of an unlock event and locking event by the smart locker device within a target time range, wherein the chain of custody event comprises at least an identifier corresponding to the user device, the server device and the smart locker device.

4. The system of claim 1, wherein the secure facility is a garage room connected to a residential home, and wherein the keypad access code is electronically coupled to a door of the garage.

5. The system of claim 1, further comprising receiving, over the communication network, by a drone device communicatively coupled to the smart locker device, a request to retrieve a parcel from the courier device based on the selection.

6. The system of claim 1, further comprising receiving, over the communication network, by the courier device, a restricted access code configured to unlock a second compartment of the set of compartments configured to store a controlled substance, wherein unlocking criteria of the second compartment requires enhanced access requirements.

7. The system of claim 1, further comprising notifying, over the communication network, by the server device, another user device of a package within the smart locker device at the first user generated residential location, wherein the another user device corresponds to a package recipient.

8. The system of claim 1, further comprising controlling, over the communication network, by the smart locker device a temperature level within the first compartment based on continuous measurements of the temperature level within the first compartment as compared to a required temperature of a package scheduled for storage within the first compartment.

9. The system of claim 1, further comprising automatically expanding nested walls of the first compartment based on a package size corresponding to the courier computing device.

10. A system, comprising:
one or more processors;
one or more storage devices comprising processor executable instructions that, responsive to execution by the one or more processors, cause the system to perform operations comprising:
receiving request data, by a set of server devices, from a set of courier devices, wherein the request data represents requests to drop a package or a request to pickup a package;
identifying, by the server device, a set of location data representing locations near the set of courier devices for drop off or pickup of the package, wherein the set of location data represents user generated locations of smart locker devices housed in user owned secure facilities;
receiving, by the server device, selected first location data for drop off or pickup of the package;
verifying, by the server device, that the selected first location data corresponds to an acceptance by a user device associated with the smart locker device and a selection by a courier device of the set of courier devices;
transmitting, by the server device, electronic keypad access code data to permit access to a user owned secure facility corresponding to the smart locker device; and
transmitting, by the server device, an unlock request to the smart locker device based on verification of the courier computing device unlocking permission status based on a set of permission criteria and satisfaction of a set of enhanced security and access requirements comprising
receiving, by the server device, authorization data of a user requesting access to the first compartment in accordance with a first security mechanism, wherein the authorization data represents an access code comprising at least one of a driver license number or social security number of an authorized user;
determining, by a processor of the server device, whether the intake authorization data is valid based on a comparison of the intake authorization data to valid authorization data and valid age data;
grant access, by the server device, to a second security mechanism for one or more predefined period of time based on determining the intake authorization data is valid authorization data;
receiving, by the server device, image data captured by a camera portion of the smart locker device corresponding to the user requesting access to the first compartment;
determining, by the processor of the server device, whether the user image data corresponds to a valid authorized user based on a comparison of the user image data to a valid authorized user image stored at a database of the server device;
granting, by the processor of the server device, access to a third security mechanism based on determining the user image data is valid user image data;
receiving, by the server device, access input data captured by the smart locker device, wherein the access input data is from a group consisting of biometric validation data and optical recognition validation data;
determining, by the processor of the server device, whether the biometric validation data or the optical recognition validation data corresponds to a valid authorized user based on a comparison of the user image data to a valid authorized biometric validation data and valid authorized optical recognition data stored at a database of the server device;
notifying, by the processor of the server device, the smart locker device of an authorization of the authorization data, the user image data, and the optical recognition validation data; and
based on the authorization of the user image data, sending, by the server device, an instruction to the smart locker device that automatically unlocks a locking mechanism of a first door of the first compartment for the one or more predefined period of time to unlock the first door.

11. A computer-implemented method comprising:
providing, over a communication network, by a server device, user interfaces to user devices, wherein the user interfaces comprise fields associated with user generated locations representing locations of smart locker devices and availability of the smart locker devices to execute smart locker operations, wherein the smart locker devices are configured to execute smart locker operations comprising at least one of storing, receiving, or providing access to one or more packages within a set of compartments of the smart locker devices, wherein the set of compartments are connected to a set of compartment doors, and wherein the smart locker devices are housed within secure facilities of the user generated residential locations;
indicating, over the communication network, by the user devices corresponding toowners of the smart locker devices, that the smart locker devices located at the user generated residential locations are available or unavailable as a destination hub for other user devices corresponding to users or authorized users acting on behalf of the users other than an owner of the smart locker devices, to execute the smart locker operations, store packages within a compartment of the set of compartments, store packages within the compartment for pickup, or retrieve packages from the compartment;
generating, over the communication network, by the server device a user generated network of residential package service facilities based on indications that the user generated residential locations are available or unavailable as the destination hub for other user devices corresponding to the users or the authorized users acting on behalf of the users other than the owners of the smart locker devices to perform the smart locker operations, store packages within the compartment, store packages within the compartment for pickup or retrieve packages from the compartment;

receiving, over the communications network and from the server device, by a courier computing device, user generated residential locations;

triggering a selection, over the communications network, by the courier computing device, of a first user generated residential location of the user generated residential locations as a target destination based at least partially on a proximity of the first user generated residential location to a location of the courier computing device, an availability of a subset of compartments of the set of compartments, a presence of target technical capabilities of a smart locker device located at the first user generated residential location, operability of the smart locker device within a target time range, and verification, by the server device, of an acceptance of the selection by a user device authorized to control the smart locker device;

verifying, over the communications network, by the server device, the acceptance of the selection of the target destination by the user device and an identity of the user device and the smart locker device;

receiving, over the communications network from the server device, by the courier computing device an electronic keypad access code to permit access to a secure facility of the smart locker device;

receiving, over the communications network from the courier computing device, by the server device an unlocking request to unlock a first compartment door of a first compartment of the smart locker device;

automatically unlocking, by the smart locker device, the first compartment door of the first compartment based on the unlocking request and a verification of the courier computing device unlocking permission status based on a set of permission criteria and satisfaction of a set of enhanced security and access requirements comprising;

receiving, by the smart locker device, authorization data of a user requesting access to the first compartment in accordance with a first security mechanism, wherein the authorization data represents an access code comprising at least one of a driver license number or social security number of an authorized user;

determining, by a processor of the server device, whether the intake authorization data is valid based on a comparison of the intake authorization data to valid authorization data and valid age data;

grant access to a second security mechanism for one or more predefined period of time based on determining the intake authorization data is valid authorization data;

triggering a capture of image data, by camera portion of the smart locker device corresponding to the user requesting access to the first compartment;

determining, by the processor of the server device, whether the user image data corresponds to a valid authorized user based on a comparison of the user image data to a valid authorized user image stored at a database of the server device;

granting, by the processor of the server device, access to a third security mechanism based on determining the user image data is valid user image data;

triggering, by the smart locker device, a capture of access input data from a group consisting of biometric validation data and optical recognition validation data;

determining, by the processor of the server device, whether the biometric validation data or the optical recognition validation data corresponds to a valid authorized user based on a comparison of the user image data to a valid authorized biometric validation data and valid authorized optical recognition data stored at a database of the server device;

notifying, by the processor of the server device, the smart locker device of an authorization of the authorization data, the user image data, and the optical recognition validation data;

based on the authorization of the user image data, the smart locker device automatically unlocks a locking mechanism of a first door of the first compartment for the one or more predefined period of time to unlock the first;

receiving, over the communication network from the smart locker device, by the server device, door sensor data representing an occurrence of the first compartment door closing based on a sensor device coupled to the first compartment door, first weight data representing a decrease of weight applied to a shelf of the first compartment coupled to a weight sensor as compared to a previous weight within a determined time interval prior to the first compartment door closing, or second weight data representing an increase of weight applied to the shelf of the first compartment coupled to the weight sensor as compared to a previous weight within a determined time interval prior to the first compartment door closing, wherein the decrease of weight represents a removal of a package from the first compartment, and wherein the increase in weight represents an insertion of the package into the first compartment; and triggering, by the smart locker device, a locking of the first compartment door based on the door sensor data, first weight data, or the second weight data.

12. The method of claim 11, further comprising generating, by the server device, a chain of custody event representing a transaction between the user device, the server device, and the smart locker device based on occurrence of an unlock event and locking event by the smart locker device within a target time range, wherein the chain of custody event comprises at least an identifier corresponding to the user device, the server device and the smart locker device.

13. The method of claim 11, further comprising receiving, over the communication network, by a drone device communicatively coupled to the smart locker device, a request to retrieve a parcel from the courier device based on the selection.

14. The method of claim 11, wherein a door of garage is configured to open via an application communicatively coupled to the garage.

15. The method of claim 11, further comprising, providing by the user device limitations on availability to the smart locker device based on restrictions on opening the door of garage at defined times.

16. The method of claim 11, further comprising, initiating, by a consumer device, a request to the courier device to deliver a package to a target smart locker device of the smart locker devices, wherein the target smart locker device is located at a target user generated residential location of the user generated locations.

17. The method of claim 11, further comprising, initiating, by a consumer device, a request to the courier device to retrieve a package from a target smart locker device of the smart locker devices, wherein the target smart locker device is located at a target user generated residential location of the user generated locations.

18. The method of claim 11, further comprising, requiring a verification of the user generated location by the user device, a consumer device, and the courier device, wherein the consumer device represents a package pick up user or a package drop off user.

19. The method of claim 11, further comprising, notifying, over the communications network, the user device that a package request for storage within the smart locker device corresponds to a parcel comprising a controlled substance associated with storage requirements and restrictive access requirements, wherein the smart locker device comprises a set of secure storage compartments configured to store the parcel.

20. The method of claim 19, wherein the smart locker device is configured to automatically execute an unlocking mechanism of the secure storage compartments of the smart locker device based on satisfaction of enhanced first compartment access requirements comprising receiving, by the smart locker device, authorization data of a user requesting access to the first compartment in accordance with a security mechanism, wherein the authorization data represents an access code comprising at least one of a driver license number or social security number of an authorized user.

* * * * *